(12) United States Patent
Lhamon et al.

(10) Patent No.: US 9,534,958 B1
(45) Date of Patent: Jan. 3, 2017

(54) MONITORING USING PASSIVE INFRA-RED SENSING

(71) Applicants: Michael E. Lhamon, Lexington, KY (US); Anuj Agarwal, Lexington, KY (US)

(72) Inventors: Michael E. Lhamon, Lexington, KY (US); Anuj Agarwal, Lexington, KY (US)

( * ) Notice: Subject to any disclaimer, the term of this patent is extended or adjusted under 35 U.S.C. 154(b) by 0 days.

(21) Appl. No.: 14/872,596

(22) Filed: Oct. 1, 2015

(51) Int. Cl.
*G01J 5/00* (2006.01)
*G01P 3/68* (2006.01)
*G01J 5/10* (2006.01)
*A01K 29/00* (2006.01)
*H04N 5/33* (2006.01)

(52) U.S. Cl.
CPC ............ *G01J 5/0025* (2013.01); *A01K 29/005* (2013.01); *G01J 5/10* (2013.01); *G01P 3/68* (2013.01); *H04N 5/33* (2013.01)

(58) Field of Classification Search
CPC ............. G01J 5/0025; G01J 5/049; G01J 3/10
See application file for complete search history.

(56) References Cited

U.S. PATENT DOCUMENTS 7,828,478 B2 * 11/2010 Rege ..................... G01J 5/0022
250/338.1
2005/0113667 A1 * 5/2005 Schlyer .................. A61B 6/037
600/411

OTHER PUBLICATIONS http://www.flir.com/science/content/?id=66897 [1].

* cited by examiner

*Primary Examiner* — David Porta
*Assistant Examiner* — Faye Boosalis
(74) *Attorney, Agent, or Firm* — Stockwell & Smedley, PSC

(57) ABSTRACT

Detecting infrared radiation from a rodent in a cage using an infrared sensor array with a field of view that corresponds to a moving area of the rodent to determine position, velocity, head position, etc. and determining a behavior of the rodent based on the detected infrared radiation.

20 Claims, 15 Drawing Sheets

Time (sec) spent in each block

| | | | |
|---|---|---|---|
| 0 | 2 | 0 | 0 |
| 0 | 358 | 0 | 0 |
| 0 | 0 | 0 | 0 |
| 0 | 0 | 0 | 0 |

FIG. 7A

MONITORING USING PASSIVE INFRA-RED SENSING

This invention was made with an award from the Kentucky Cabinet for Economic Development, Office of Commercialization and Innovation, under Grant Agreement KSTC-184-512-13-158 with the Kentucky Science and Technology Corporation. This invention was made with government support under 2R44NS083218 awarded by National Institutes of Health. The government has certain rights in the invention.

FIELD OF THE INVENTION

The present invention relates generally to environment sensing and, more particularly, to temperature sensing.

BACKGROUND

There are a variety of invasive and non-invasive techniques for monitoring animals such as rodents. For example, capturing video data from a rodent's cage is one way to track movement and deduce other behaviors of the rodent. Video tracking however, has a number of significant drawbacks. The data is typically high bandwidth data and large amounts of such data can quickly accumulate. Furthermore, the quality and usefulness of video data of a rodent cage environment can depend on available lighting and sometimes requires additional lighting that may cause the rodent to modify its behavior. One additional complication of using video data is that automatic image analysis may be difficult. In order to provide automatic scene analysis, the various frames of the video data can be segmented into different objects so that movement of one or more of the objects can be tracked through a series of frames. Such segmentation and analysis can add computational complexity and overhead.

Invasive techniques for tracking some aspects of animal behavior are known such as Electroencephalographic (EEG) and Electromyographic (EMG) recordings. However, the surgery, surgery recovery, and signal scoring, among a number of other factors, limit their application to relatively small-scale studies.

Infrared radiation is a property of rodents, as well as other animals, and is capable of measurement by non-invasive means. Mammalian skin, irrespective of its color, radiates as a near perfect black-body. Similarly, the surface of an avian body also emits infrared radiation. Furthermore, the energy radiated by a black-body at room temperature is mostly infra-red, which can be captured and converted to an image using an infrared (IR) sensor.

One typical sensor for detecting movement is a passive infrared pyroelectric (PIR) sensor, such as those commonly used in security and room occupancy sensing. However, PIR sensors can only detect movement based on sudden temperature change. Furthermore, these types of sensors adapt to the environment in as little as a few minutes. Thus, the PIR sensor can become blind to a resting test subject within a relatively short period. This susceptibility can adversely impact a sensor's accuracy for detecting animal behaviors tied to low level signals such as behaviors during sleep and rest.

SUMMARY

Aspects of at least some embodiments of the present invention include a method for detecting and tracking rodent behavior, including providing a first infrared sensor array including a thermometer and at least two infrared sensing elements including, but not limited to, respective thermocouples or thermopiles, the first infrared sensor array having a field of view comprising a viewing angle of the first infrared sensor array and a distance from at least one surface in the field of view, positioning the first infrared sensor array such that some or all of the floor enclosed by the cage is within the field of view of the first infrared sensor array, wherein the cage comprises a cage floor or multiple cage floors, receiving a first blackbody signal from one or more rodents, wherein the first blackbody signal comprises infrared radiation that is radiated from rodent surface to at least one infrared sensor in the first infrared sensor array, and generating a first frame of temperature data from the received blackbody signal, wherein the first frame comprises a set of pixels, wherein each respective pixel represents respective pixel average surface temperatures, wherein the respective pixel average surface temperatures correspond to an average blackbody surface temperature of the surfaces within the respective fields of view of the sensors.

Other aspects relate to a system for detecting rodent movement, including a first rodent in a first cage, the first cage comprising a first floor and a first perimeter, a first infrared sensor array configured to receive a first signal comprising infrared radiation radiated from a surface of the first rodent, wherein a field of view of the first infrared sensor covers a portion of, or the entire, moving area of the first rodent, wherein the infrared sensor array is configured to output a first frame to a data analyzer, and wherein the data analyzer is configured to receive the first frame and to generate a first segmentation or contour map therefrom.

BRIEF DESCRIPTION OF THE DRAWINGS

Various aspects of the present invention are illustrated by way of example, and not by way of limitation, in the accompanying drawings, wherein:

FIG. 7A depicts a histogram map developed from a six minute segment of the contour maps of FIGS. 6A-6C in accordance with the principles of the present invention.

DETAILED DESCRIPTION OF THE PREFERRED EMBODIMENTS

Figure 1A:
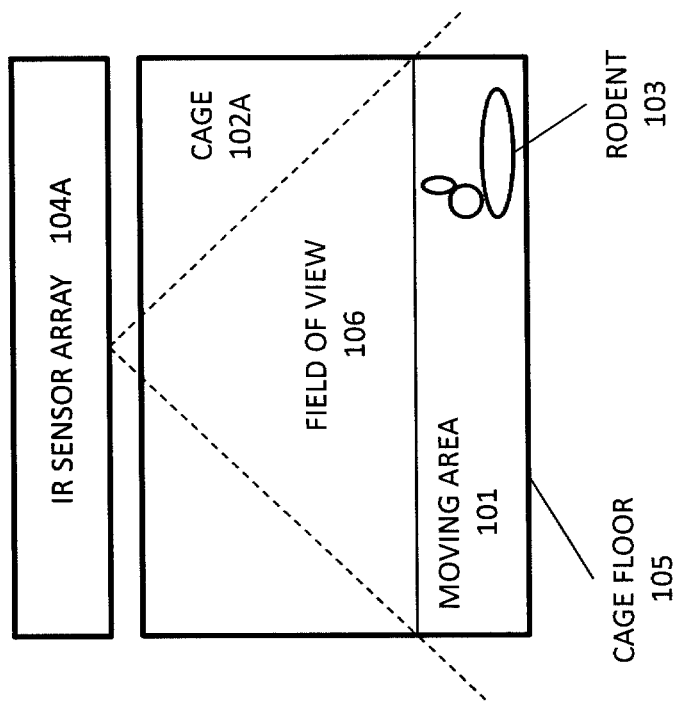
FIG. 1A represents a cage for measuring blackbody radiation from a rodent and interpreting a behavior of the rodent based on the measured radiation in accordance with the principles of the present invention.

The present application is related to U.S. patent application Ser. No. 14/523,994 filed on Oct. 27, 2014 entitled Noise Cancellation for Piezoelectric Sensor Recordings, the contents of which are incorporated herein by reference in their entirety.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the description below, reference is made to a passive infrared (IR) sensor by way of example only and one of ordinary skill will recognize that other functionally equivalent sensors can be used without departing from the scope of the present invention.

In the description below, reference is made to a rodent by way of example only and one of ordinary skill will recognize that other functionally equivalent animals, such as any animal that emits IR radiation, may be used without departing from the scope of the present invention.

In the description below, "infrared light," "infrared emission," and "infrared radiation" all refer to electromagnetic waves of wavelength from one millimeter to 700 nanometers, unless otherwise specified.

In the description below, "rodent" refers to any living being that emits black body radiation, most of which is in the infrared zone from the surface of the animal that is distinguishable from the environment by an infrared sensor array such that the presence, movement and death of the animal is detectable.

In the description below, horizontal or vertical position refers to movement along the plane of the ground of the cage.

In the description below, "temperature data" refers to a data representation of the approximated average temperature of the surfaces of IR radiation within respective fields of view of the respective IR sensors of the IR sensor array. For example, an array of temperature values that correlate to respective average surface temperatures at each respective IR sensor's field of view.

In the description below, "experiment data" refers to one or more temperature data with identifying data to correlate each respective temperature data with each respective IR sensor array.

In the description below, "frame" refers to a set of related temperature data of the IR sensor array.

In the description below, "pixel" refers to an individual temperature value of a single IR sensing element.

In the description below, "visible light pixel" refers to a color data representative of wavelengths of visible light received from an object at a single point in time.

In the description that follows, the term "cage" is used to encompass a variety of different enclosures. A cage can include a typical cage that houses a rodent with solid perimeter walls located around a floor. However, as used herein, a cage is intended to encompass any space occupied by a subject that is being observed.

Many experiments involving mammal behavior have been performed using invasive or restrictive means. Invasive means include (EMG) and (EEG) because sensors must be implanted or ingested in the animal's body. Restrictive means may include any means requiring a wire or a blanket with an accelerometer. Each of these invasive and restrictive means may alter rodent behavior due to stimuli resulting from surgery or restrictions on movement. Furthermore, these methods may produce large volumes of data, thereby requiring undue time and resources for processing the measured data.

Video is available as a non-invasive means of assessing rodent behavior, thereby allowing stimuli altering the rodent's behavior to remain limited to the stimuli intentionally introduced by the experimenter. However, video constantly captures reflected light. Thus, some form of light must constantly illuminate the cage 102, which would require extra equipment and setup time. Also, special segmentation software is required to identify visible light pixels associated with the rodent and to track and interpret rodent movement. Furthermore, abnormalities in reflection of visible light may result in harmful outliers in the data collected. For example, special lighting may be required to minimize shadows. These shadows or reflections of light off the cage 102 may interfere with the segmentation software to identify visible light pixels associated with the rodent. Finally, streaming video requires high data volume and therefore more processing resources.

Thus, embodiments of the present invention provide for an infrared radiation sensor that avoids the complexities involved with capturing video data and properly segmenting it to identify rodents and rodent behaviors. As will be described more fully below, sensed radiation can be mapped without complex manipulation in a way that essentially automatically segments a captured image scene. Furthermore, also as more fully described below, the manner in which the radiation is sensed and captured provides a relatively low-bandwidth alternative to high-bandwidth video capture techniques.

Embodiments of the present invention sense infrared (IR) radiation as part of monitoring rodent behavior. Short wavelength infrared light (near visible infrared light) detectors can be used but may require emission of short wavelength infrared light, the reflection of which can then be detected and measured. Rodents may also be able to see this short wavelength infrared light and therefore behavior of the rodent may be altered.

However, long wavelength infrared radiation emitted from the rodent's body may be detected without unintentionally introducing a stimulus that may alter the rodent's behavior. Based on detecting emitted IR radiation from the rodent, the rodent's position and distance from the IR sensor array may be correlated with time to analyze the rodent's behavior.

FIG. 1 includes a progression of four diagrams FIGS. 1A-1D according to the principles of the present invention. FIG. 1A represents a cage 102a for measuring blackbody radiation from a rodent and interpreting a behavior of the rodent based on the measured radiation. In this embodiment, an infrared (IR) sensor array 104A may be distanced orthogonally from the cage floor 105. As will be seen, the IR sensor array 104A can be placed in alternate positions. The IR sensor array 104A may be directed toward the cage floor 105 such that a field of view 106 of the IR sensor array 104A captures at least part of a moving area 101 of the rodent 103. However, embodiments include the field of view 106 capturing the entire moving area 101. As an example, a high precision Panasonic infrared sensor array 104 may be used to track surface temperatures of the rodent 103 inside a cage 102.

Figure 1B:
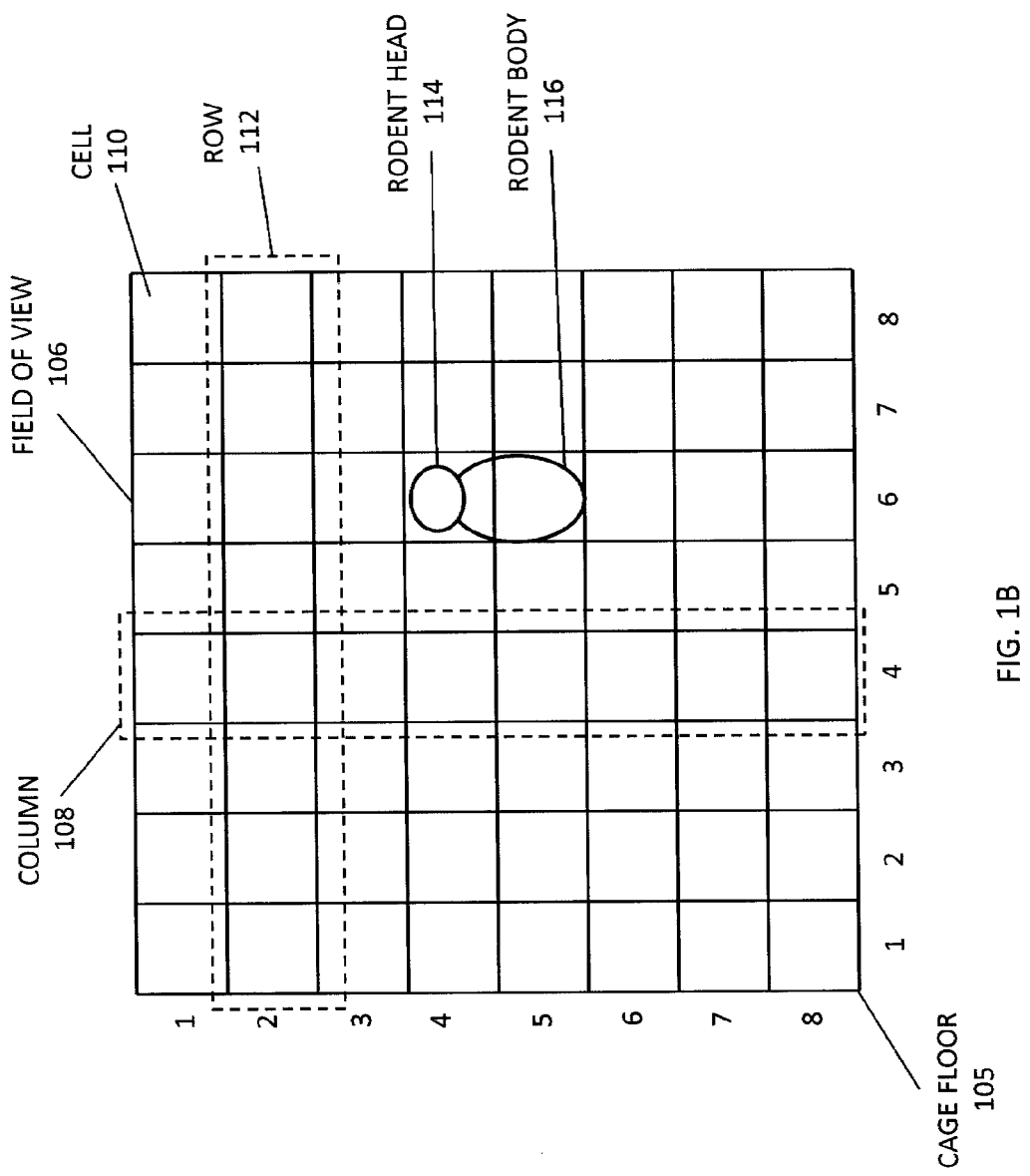
FIG. 1B represents a view of the cage floor, as seen from the point of view of the IR sensor array of FIG. 1A in accordance with the principles of the present invention.

FIG. 1B represents the cage 102A from the point of view of the IR sensor array 104A. In this view, the field of view 106 may capture the cage floor 105. Furthermore, the field of view 106 may be divided into a grid of 8×8 cells 110 (64 total cells 110). The division of the field of view 106 may be determined by the arrangement of IR sensors within the IR sensor array 104A. In this example, the IR sensor array 104A comprises 8×8 individual IR sensors. Furthermore, each cell 110 may be correlated with the individual fields of view of the respective IR sensors in the IR sensor array 104A. The rows 112 may be numbered from top to bottom from 1 to 8, respectively. Also, the columns 108 may be number from left to right from 1 to 8, respectively. Thereby, the origin of the grid is in the upper left corner, and locations in the grid can be identified by coordinates. In this example, the rodent head 114 is contained within cell (4, 6). The rodent body 116 spans from (4,6) to (6,6). Alternatively, the field of view 106 may be divided into grids of 4×4, 16×16, 1×8, 80×60 or any other arrangement. Each of the cells may be aligned in rows 112 and columns 108.

Figure 1C:
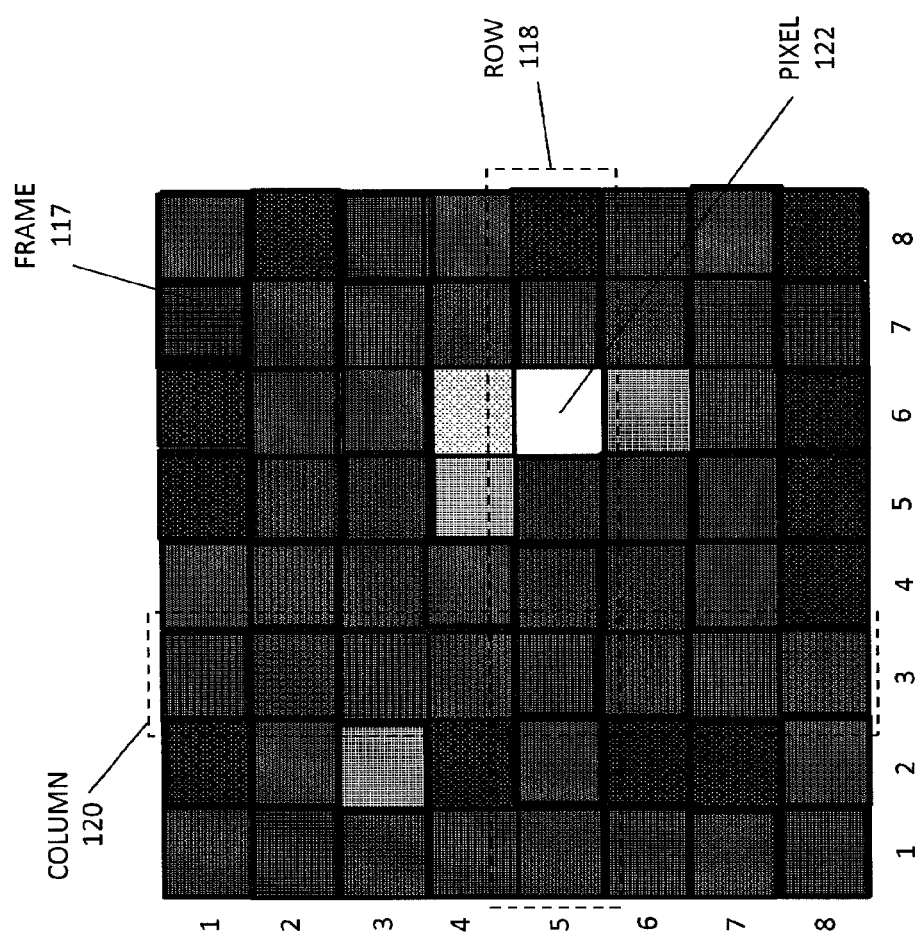
FIG. 1C represents a frame of a field of view of the IR sensor array in accordance with the principles of the present invention.

FIG. 1C represents a frame 117 of the field of view 106 of the IR sensor array 104A. As previously stated, the IR sensor array 104A may receive blackbody IR radiation from the rodent 103. Each respective IR sensor in the array may receive IR radiation from all surfaces within the field of view of the respective IR sensor. The temperatures provided by each respective IR sensor may represent average blackbody surface temperatures within the respective fields of view and may further be determined from the average IR radiation received from within the respective fields of view. Therefore, the IR sensor array 104A may provide a frame 117 comprising a grid of 8×8 average blackbody surface temperatures. The frame 117 may also comprise rows 118 and columns 120. Each pixel 122 in the frame 117 may be presented as a single temperature in a matrix or array. Alternatively, each pixel 122 in the frame 117 may be one of a plurality of respective levels, wherein each level is displayed as a discrete color (e.g., 320 different colors). Furthermore, the colors may be arranged such that cool colors (e.g. greens, blues, purples) may represent lower temperatures within the range of the IR sensor array 104. Higher temperatures may be represented by warmer colors (e.g. red, orange, yellow). In this example, the temperature range spans from 70 degrees F. to 88 degrees F.

The IR sensor array 104A may take a frame at ten times per second. However, more or less frames per second could be taken. The IR sensor array 104A may have a viewing angle of nearly 60 degrees in both horizontal and vertical directions. The IR sensor array 104A was at a height of 12 inches from the floor of the cage 102A and thus could track an area of at least 36 square inches at this height.

As can be seen, the moving area 101 can be divided into a grid to correspond with physical locations in the moving area 101 according to the arrangement of the respective fields of view of the respective IR sensors in the IR sensor array 104. Similar to the field of view 106 of FIG. 1B, the frame 117 may be divided into numbered rows 118 and numbered columns 120 having an origin in the upper left corner. Therefore, the field of view of an IR sensor array 104 having 1×8 IR sensors could be divided into a 1×8 grid.

Each physical location in the moving area 101 also corresponds to the respective pixels 122 of each frame 117 captured by the IR sensor array 104. As can be seen, each pixel 122 represents an average temperature determined by each respective sensor in the IR sensor array 104a. Furthermore, each temperature can correspond with the respective physical location in the cage 102A. Also, note that the body 116 and the head 114 of the rodent can typically be identified and tracked. The pixel, or pixels, covering the body may be hotter than the pixel, or pixels, covering the head due to the tail temperature. In rats, for example, the tail comprises of only 5% body surface area but can dissipate about 17% of its body heat, a similar relationship exists for the head, which is what is typically tracked. So the head is small but hotter. The head and tail have less fur and a high surface to volume ratio and is perfused with many blood vessels.

Figure 1D:
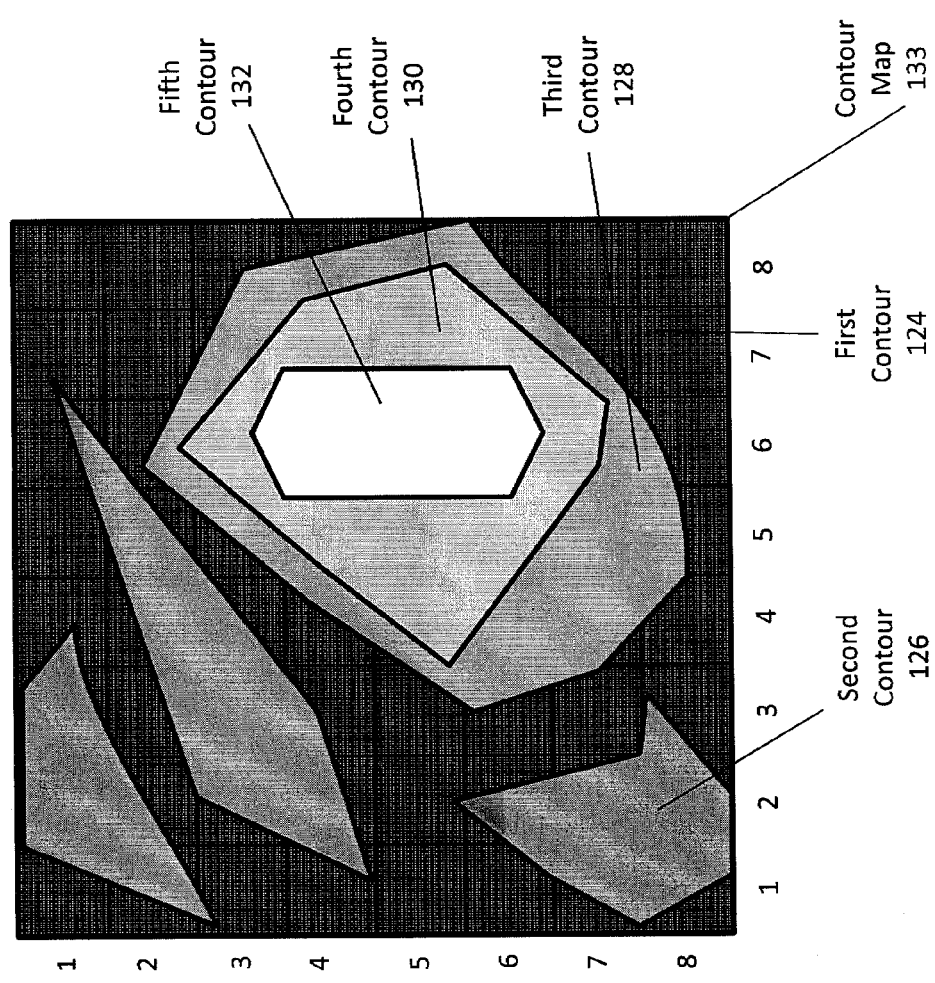
FIG. 1D is a pseudo-color segmentation map using contours developed from the frame of FIG. 1C in accordance with the principles of the present invention.

FIG. 1D is a pseudo-color contour map 133 representation of the frame 117. This contour map 133 may be generated with simple thresholding and implemented with common commercial software, such as MATLAB. The range of temperatures detected may be divided into a set of contour levels, e.g. five levels. Therefore, each respective level may represent a range of temperatures. The contour levels may further have respective ranges that are equal. For example, the contours may display temperatures from 70 degrees F. to 85 degrees F. The total temperature range of this example would then be 15 degrees F. 15 degrees divided by five groups would result in equal respective contour levels of 3 degrees. However, the total temperature range could be divided such that the respective contour levels are not equal. For example, the first contour level could range from 70 to 80 degrees F. and each respective second through fifth contour level could span one degree. In this manner, a temperature range of interest could be depicted by the contour map with greater granularity.

Returning to the contour map 133, each respective contour 124-132 may be represented by a corresponding level, wherein the contour represents the physical area and the color of the contour represents the contour level. Similar to the frame 117, warm colors may correspond to higher temperatures and cooler colors may correspond to lower temperatures. Obviously "higher" temperatures may mean temperatures higher than the median temperature of the range and "lower" temperature may mean temperatures lower than the median temperature. Of course, this generality does not bind the present invention to require dividing contours at the median, and therefore a contour containing the median temperature could be represented by warmer, cooler, or even neutral colors.

The first contour 124 may be indigo. The second contour 126 may be blue. The third contour 128 may be green. The fourth contour 130 may be orange. The fifth contour 132 may be yellow. As seen in the contour map 133, the individual contours do not necessarily follow the boundaries of the pixels 122 but may approximate temperature boundaries within the physical area of the field of view 106.

Figure 2A:
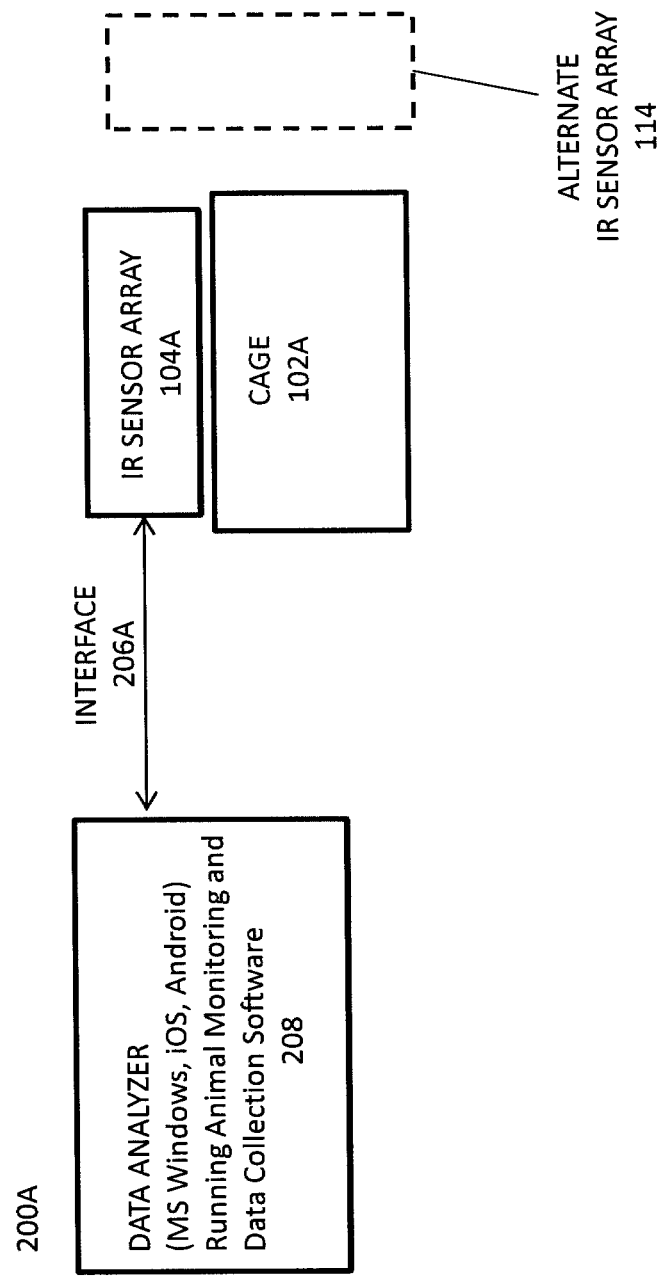
FIG. 2A depicts a block-level diagram of an animal sensing system with an IR sensor array on a cage in accordance with the principles of the present invention.

FIG. 2A depicts a block-level diagram of an animal sensing system 200A with an IR sensor array 104A on the cage 102A in accordance with the principles of the present invention. The system 200A can, for example, classify time intervals on the order of two to four seconds as corresponding to motions consistent with activity associated with an animal being awake or with inactivity associated with the animal sleeping. However, the system 200A can classify longer time intervals such as one minute, five minutes, 20 minutes, one hour, or 12 hours. The system 200A may capture a frame of temperature data each minute, every hour, or even ten per second.

At a general level, the system 200A includes a cage 102A for a rodent, for example, that has an IR sensor array 104 for detecting emitted heat of the rodent within the cage 102A. In this embodiment, the IR sensor array 104A may be positioned outside, inside, or over the cage 102A such that infrared light emitted by the caged rodent is detectable by the overhead IR sensor. Alternatively, The IR sensor array 104B may be placed at any side or below the cage 102A, or off-axis to the cage, such as a corner placement. In this embodiment, the rodent 103 may walk closer to or farther from the IR sensor array 104B. Thus, the rodent 103 may appear larger when approaching the IR sensor array 104B due to increased occupancy of the field of view 106. This embodiment would also detect linear position changes wherein the rodent moves position but does not change size. The system 200A may also include an interface 206A whereby information detected by the IR sensor array 104A may be transmitted to a data analyzer 208. The IR sensor array 104A may optionally be attached to the cage 102A. This attachment may be accomplished by magnetic coupling between the cage 102A and the IR sensor array 104A, by clamping the IR sensor array 104A to the cage 102A, or by any other means of securing the IR sensor 104A to the cage 102A. Alternatively, the IR sensor array 104A may be supported by an external support such as a stand or a shelf.

The cage 102A may comprise any material and shape capable of retaining an animal within the bounds of the cage 102A. Furthermore, materials of the cage 102A may allow transmission of infrared radiation at any area of the cage 102A within the field of view 106 of the IR sensor array 104 and between the animal and the IR sensor array 104A. An IR opaque material could be used for the entire case if a hole in the cage 102A allowed the IR sensor array 104A to receive emitted infrared radiation from the animal while also retaining the animal within the boundaries of the cage 102A. In one embodiment, the material of the cage 102A is transparent to visible light for observation of animal behavior by a bystander or video camera.

In one embodiment, the cage 102A may allow transmission of infrared radiation at wavelengths of 4 to 14 micrometers from the rodent 103 to the IR sensor array 104A. Examples of IR transmitting material vary based on the wavelength desired to be observed. Near-IR (NIR) is from about 800 nm to about 2500 nm. Medium wavelength IR (MWIR) is from about 3000 to about 5000 nm. Long wavelength IR (LWIR) is from about 8000 to about 14000 nm. NIR may be transmitted by many silica-based glasses as well as a variety of plastics and polycarbonates, which means that these materials may allow transmission of NIR through the materials. One of ordinary skill may select a material based on the known infrared transmittance of the material. Alternatively, one of ordinary skill could perform an infrared transmittance analysis of the material. Of course, one of ordinary skill would choose the material that exhibits reasonable transmittance of the wavelength(s) desired for detection. The radiation wavelengths desired for detection may include radiation of a range of infrared wavelengths emitted by the rodent 103, within a range of detection of the infrared sensor array, and that is transmitted by at least part of the cage material. Separate from practicing the present invention, the wavelengths of radiation emitted by the animal may be determined by infrared wavelength analysis without any material between the infrared wavelength sensor and the animal.

In accordance with the principles described, these materials may be formed into solid walls, slotted walls, lattices, wire frames, or any other pattern sufficient for retaining the animal. The cage 102A comprises a floor 105 on which the animal may tread or rest, and can, for example, comprise a perimeter of three or more walls, if straight walls are used. Furthermore, the cage 102A may comprise one or more curved walls as long as a perimeter capable of retaining the animal is formed. A cage wall may comprise any shape that forms a perimeter and retains the animal within the bounds of the perimeter. The cage 102A may optionally have a top, which may enclose the area above the perimeter that retains the animal. One optional use of the top of the cage 102A is for supporting an infrared sensor array 104 for detection of the animal.

Several options exist for placement of the infrared sensor array 104A relative to the cage 102A. Because the animal is confined within the boundaries of the cage 102A, it is desirable that the infrared sensor array 104 be aimed toward the cage 102A such that infrared radiation from the surface of the animal may be detected by the infrared sensor array 104A. More specifically, the infrared sensor must be positioned and angled such that the field of view 106 and a moving area 101 of the animal overlap on at least one point. The IR sensor array 104 may be attached to the cage, supported by an external support, such as a stand or suspension wire, or any other means of achieving the position and angle stated above.

The moving area 101 of the animal means the physical space that the animal may enter. For example, earthbound animals may move horizontally or vertically along the ground. This movement may be in the plane of the viewing cross-section of the infrared sensor array. Therefore, the moving area 101 of the earthbound animal would comprise the area within the perimeter of the cage 102A as well as the space above the ground equal to the height of the animal. Alternatively, flying animals may move horizontally or vertically along the ground or orthogonally away from the ground. Therefore, the moving area 101 of a flying animal would comprise the entire space within the bounds of the cage 102A.

Data analyzer 208 may be in electronic communication with the IR sensor array 104A, for example, by an interface 206A. The IR sensor array 104A and the data analyzer 208 may be in communication with one another. The interface 206A may comprise wired or wireless transmission between the IR sensor array 104A and the data analyzer 208. The interface 206A may comprise electrical signals, electromagnetic signals, radio signals, compression signals, or any other signal for the transmission of data. One objective of the interface 206A is to transmit the data received by the IR sensor to the data analyzer 208 in order to investigate rodent behavior.

A timing circuit, not shown, may also be present in the system 200A. The timing circuit may also utilize the interface 206A to communicate with the IR sensor array 104A and/or the data analyzer 208. Alternatively, the timing circuit may be incorporated as part of the data analyzer 208 or as part of the IR sensor array 104A. The timing circuit may provide objective time, such as UTC, or relative time. The timing circuit may also be used to provide absolute time, such as a timestamp, or relative time, such as elapsed time. A data structure may store the timestamp and a frame of temperature data that corresponds to the time stamp.

The IR sensor array 104A, as used herein, may comprise one or more IR sensors. At this time, example IR sensor arrays 104A are produced by Omron or Panasonic as an 8×8 sensor array, a 4×4 sensor array, or a 1×8 sensor array, or FLIR 80×60 sensor array. These arrays can be used to generate a respective 8×8, 4×4, or 1×8 pixel frame of temperature data, wherein each pixel in the frame comprises a pixel average surface temperature calculated by the respective IR sensor based on the intensity of infrared light received from the blackbody and the surrounding surfaces in the field of view 106. The pixel average surface temperature is an approximation by each respective corresponding IR sensor in the sensor array of the average surface temperature of all surfaces in the field of view of each respective sensor in the sensor array. This approximation is based on the IR radiation received in the respective IR sensor field of view of a sensor and averaged over this respective field of view. Therefore, the averaging effect in the approximation of temperature may allow a large area of background in the field of view of a sensor to wash out the rodent 103, thus resulting in a pixel average surface temperature that may not be representative of the surface temperature of the rodent 103. Therefore, the IR sensor array 104A may be placed at such distance that the animal occupies at least 50 percent of the field of view of at least one IR sensor in the IR sensor array.

Exemplary sensor arrays may, for example, be able to output temperature with a resolution that ranges from between about 0.10° C. to 0.30° C. Therefore, "about" a temperature means at least within the resolution of the respective IR sensor array 104A. These IR sensor arrays 104 may give object accuracy and detection ranges of 5° C. to 50° C. for the surface temperature of the blackbody. Furthermore, a human body may be detected up to 5 meters from the IR sensor array 104A. The IR sensor arrays 104A may also have a temperature sensor to account for ambient temperature of the sensor array itself in the determination of pixel average surface temperature.

The IR sensor arrays 104A of FIG. 2A-2D differ from traditional pyroelectric sensors. Pyroelectric sensors, as used in security or office presence detection systems, detect changes in emitted infrared radiation. However, each IR sensor in the IR sensor array 104A acts as a thermocouple or thermopile, and directly approximates the average respective surface temperature of infrared radiation sources within each pixel. This approximation is possible after calibration due to a predictable relationship between voltage generated in the thermocouple and intensity of radiation received. In one example, the IR sensor array is capable of detecting infrared radiation in a manner to determine temperature for objects that are 0 degrees Celsius to 50 degrees Celsius. While the terms "thermopile" and "thermocouple" are used herein to refer to the type of sensor used to approximate the surface temperature of infrared radiation sources, these terms are intended to encompass various thermography sensors in general. Thus, arrays of other types of sensors that can also measure black body radiation can be used in place of, or in addition to, thermocouples and thermopiles, without departing from the scope of the present invention.

Because interference can be an issue, low wavelength infrared light may be selected such that reflected light from the environment is negligible. Furthermore, infrared remotes and other manmade devices emit short wavelength infrared light in the 0.6 to 1.2 micrometer wavelength range. Thus, some embodiments measure blackbody infrared emissions from the rodent 103 at wavelengths of four to 14 micrometers. Furthermore, some embodiments may measure blackbody surface temperatures from 0-80° C.

Furthermore, the IR sensor array 104A may be placed at a specific height above the cage floor 105. In this manner, the physical position on the floor 105 may be correlated to identifiable pixels of the frame 117. For example, an IR sensor with a horizontal and vertical viewing angle of 60 degrees placed 12 inches above the floor may have a known viewing area of 36 square inches. Furthermore, the viewing area 106 may be divided into pixels such that each pixel corresponds to a physical location in the cage 102A. Additionally, overlap of the viewing area of the IR sensor array 104A and the moving area 101 of the animal is desirable such that receiving infrared radiation from the surface of the rodent 103 becomes possible.

In an example of an 8×8 sensor array 104A, there are 64 total sensors that correspond to 64 pixels. If the viewing area is 36 square inches, each pixel would then correlate to about 0.56 square inches. As expected, distance of the IR sensor from the floor of the cage 102A is directly related to the detectable area of the cage floor 105. Thus, moving the IR sensor closer to the cage floor 105 may decrease the area detected by the IR sensor. Because this change results in a smaller viewing area for each IR sensor in the array, each pixel would correspond to a smaller area of the floor. Thus, higher resolution of detected temperature in relation to absolute area of the cage floor 105 may be obtained. Based on the above 8×8 IR sensor array arrangements, a frame may be taken using the IR sensor array 104A wherein temperature data is received in a 64 cell array corresponding to respective sub-segments of area of the cage floor 105. Similarly, a 4×4 IR sensor array may generate a 16 pixel frame of temperature data and an 8×1 IR sensor array may generate an eight pixel frame of temperature data. These infrared sensor array cell arrangements are given as an example only and other arrangements may be customized to fit the viewing area 106 desired.

Distance from the IR sensor to the blackbody surface is related to an area of the detected heat signal due to the objects increased occupancy of the field of view 106. Additionally, distance and intensity of infrared radiation are related by $I=1/d^2$, wherein I is intensity and d is distance. Scattering and absorbance by air may be negligible, and the IR sensor array 104A may be calibrated to account for distance-induced intensity changes.

In embodiments with a side mounted IR sensor array, the moving area 101 of the animal may comprise a cross-section of the perimeter and the height of the animal. However, side mounted IR sensor arrays 104A present the challenge that the animal may alter the distance between the IR sensor array 104A and the animal by moving orthogonally to the plane of the viewing cross-section. Due to the relationship between change in occupancy of field of view and intensity with distance, the IR sensor array 104A may be calibrated with a known temperature at a known distance. Then, increases in occupancy of field of view and intensity may be correlated to account for changes of voltage generated in the thermocouple to retain accuracy of the IR sensor array's 104A approximation of surface temperature. Afterwards, each sensor of the IR sensor array 104A may provide accurate temperature data regardless of variation in overall intensity of detected radiation.

Thermocouple-based sensor arrays typically contain a thermometer to measure ambient temperature and can account for changes in intensity when calculating an approximate pixel average surface temperature for a sensor regardless of distance of the emitting surface from the sensor. However, the closer the rodent 103 is to the IR sensor array 104A, the larger the IR emitting area is perceived to be. Additionally, the ambient temperature measured by the thermometer may be output as a reference temperature in the temperature data. The IR sensor array may, for example, accurately report temperature in ambient temperatures in a range of 0 degrees Celsius to 45 degrees Celsius.

More specifically, as distance increases, intensity decreases. Similarly, as distance decrease, intensity increases. Also, distance and voltage generated by the thermocouple may be indirectly related. However, the thermocouple contains a thermometer to calibrate emissions received against the ambient room temperature. The thermocouple may also approximate the pixel average surface temperature based on the relationship between ambient temperature and voltage generated and may account for changes in intensity related to corresponding changes in distance. One of ordinary skill can use basic trigonometry to correlate a change in the size in the field of view of an animal of known physical size in order to calculate a distance of that rodent 103 from the IR sensor. The distance can then be used to account for changes in intensity according to the intensity formula above. This function is typically performed by the IR sensor array 104A, but may also be performed by a controller, the data analyzer 208, or any other device capable of making this calculation. Analyzing a change in intensity may also be useful for analyzing animal behavior. When the rodent raises its head, the height between the rodent's head and the IR sensor array 104A decreases. In embodiments wherein the IR sensor array 104A only outputs temperature, a larger area within the field of view 106 of the sensor array 104A may be perceived to be emitting IR radiation when the rodent raises its head. Detecting changes in an area of emission (altered average pixel temperature of at least one pixel) may be useful for determining wakefulness, eating, hyperactivity, etc. of the rodent.

Another characteristic useful for detecting wakefulness of the rodent may arise from a change in a horizontal or a vertical position of the rodent relative to the cage floor 105. Generally, a sleeping rodent will remain in place for the duration of its sleep and may move upon arousal. In this manner, movement from one position to another may indicate a period of wakefulness in the rodent.

Other sensors may be coupled with the IR sensor for analyzing rodent behavior. For example, piezoelectric sensors may be placed on the floor to detect pressure due to a rodent along the cage 102 floor.

Figure 2B:
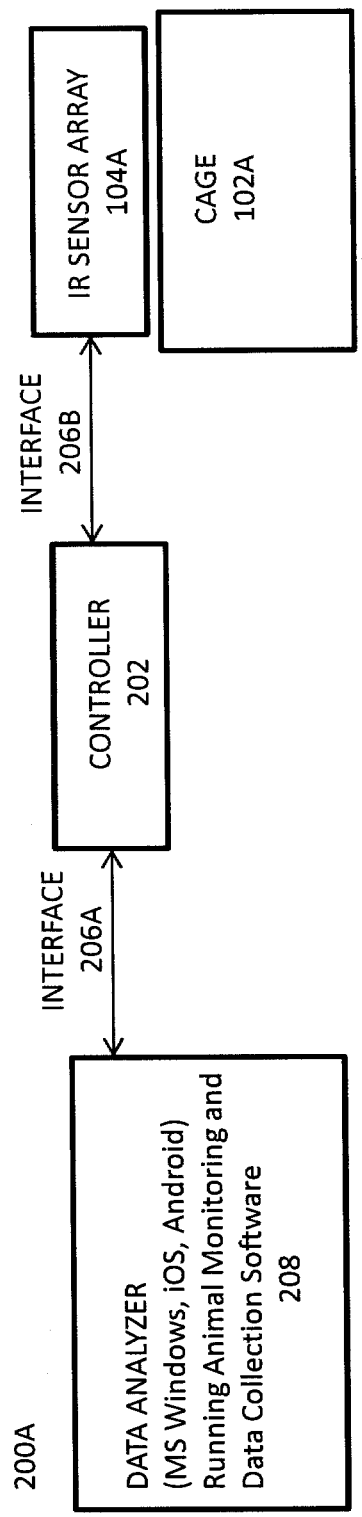
FIG. 2B depicts a block-level diagram of an animal sensing system interfacing with a controller that is connected to a data analyzer in accordance with the principles of the present invention.

FIG. 2B depicts a block-level diagram of animal sensing system 200B, another embodiment of the animal sensing system 200 of the present disclosure, interfacing with a controller 202 that is connected to a data analyzer 208. The controller 202 may be used to filter, manipulate, redirect, etc. data from the IR sensor array 104A to the data analyzer 208. The controller 202 may allow management of data from multiple IR sensor arrays 104A, such as during a high throughput experiment wherein at least ten respective infrared sensor arrays monitor respective animals in respective cages. For example, the controller 202 may store respective temperature data from each of multiple IR sensor arrays 104A in a manner useful for correlating each temperature data with the IR sensor array 104A that collected the data. In one embodiment, an array may be used wherein the index represents the IR sensor array 104A and the value represents the temperature data.

Figure 2C:
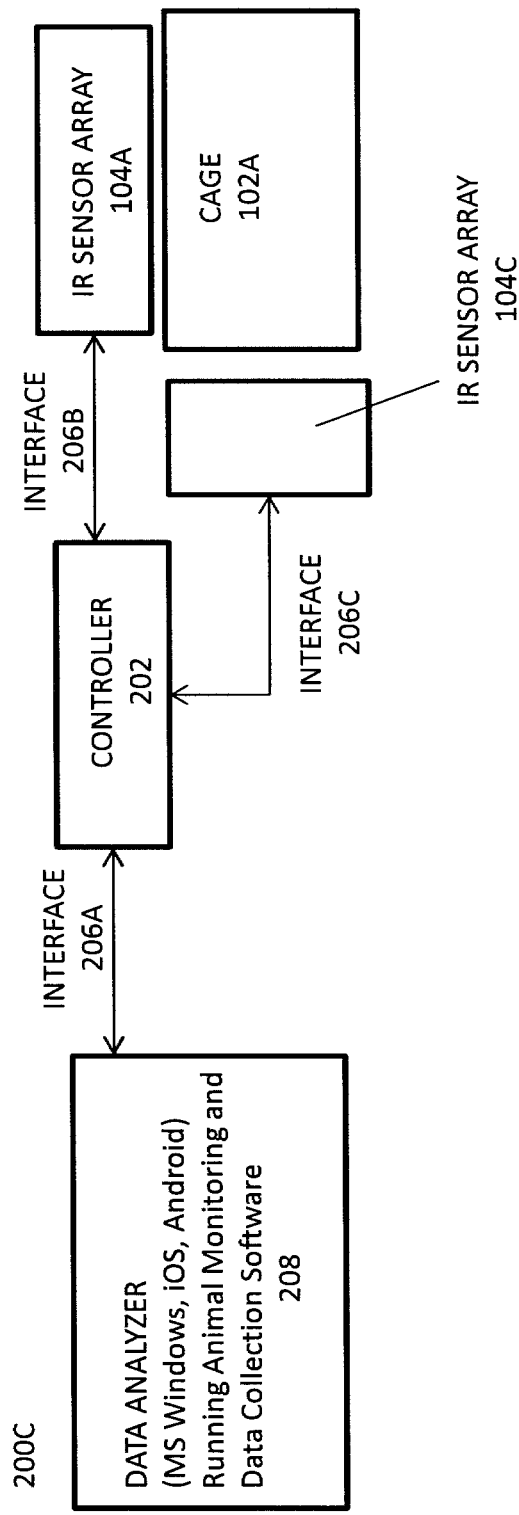
FIG. 2C depicts an animal sensing system wherein multiple IR sensor arrays are placed around the same cage and interface with the controller in accordance with the principles of the present invention.

FIG. 2C depicts the animal sensing system 200C, another embodiment of the animal sensing system in accordance with the present disclosure, wherein multiple IR sensor arrays 104A, 104C are placed around the same cage 102A and interface with the controller 202. In this embodiment, an IR sensor array 104A is on top of the cage 102A and another IR sensor array 104C is on the side of the cage 102A. Both IR sensor arrays 104A, 104C are directed into the cage 102A to detect IR emissions from within the cage 102A. One of ordinary skill could add additional IR sensor arrays or alter the positions of the various IR sensor arrays. The multiple IR sensor arrays 104A, 104C can send temperature data to the controller 202 via respective interfaces 206B, 206C. The interfaces 206B, 206C used may be wired or wireless and may be analog or digital. Some example interfaces may include internet, wireline, optical fiber cable, RF, etc. The controller 202 may act as a gateway to correlate temperature data with respective IR sensor array 104A, 104C sources of the temperature data, thereby allowing the data analyzer 208 to reconstruct a physical model of the animal's behavior.

Figure 2D:
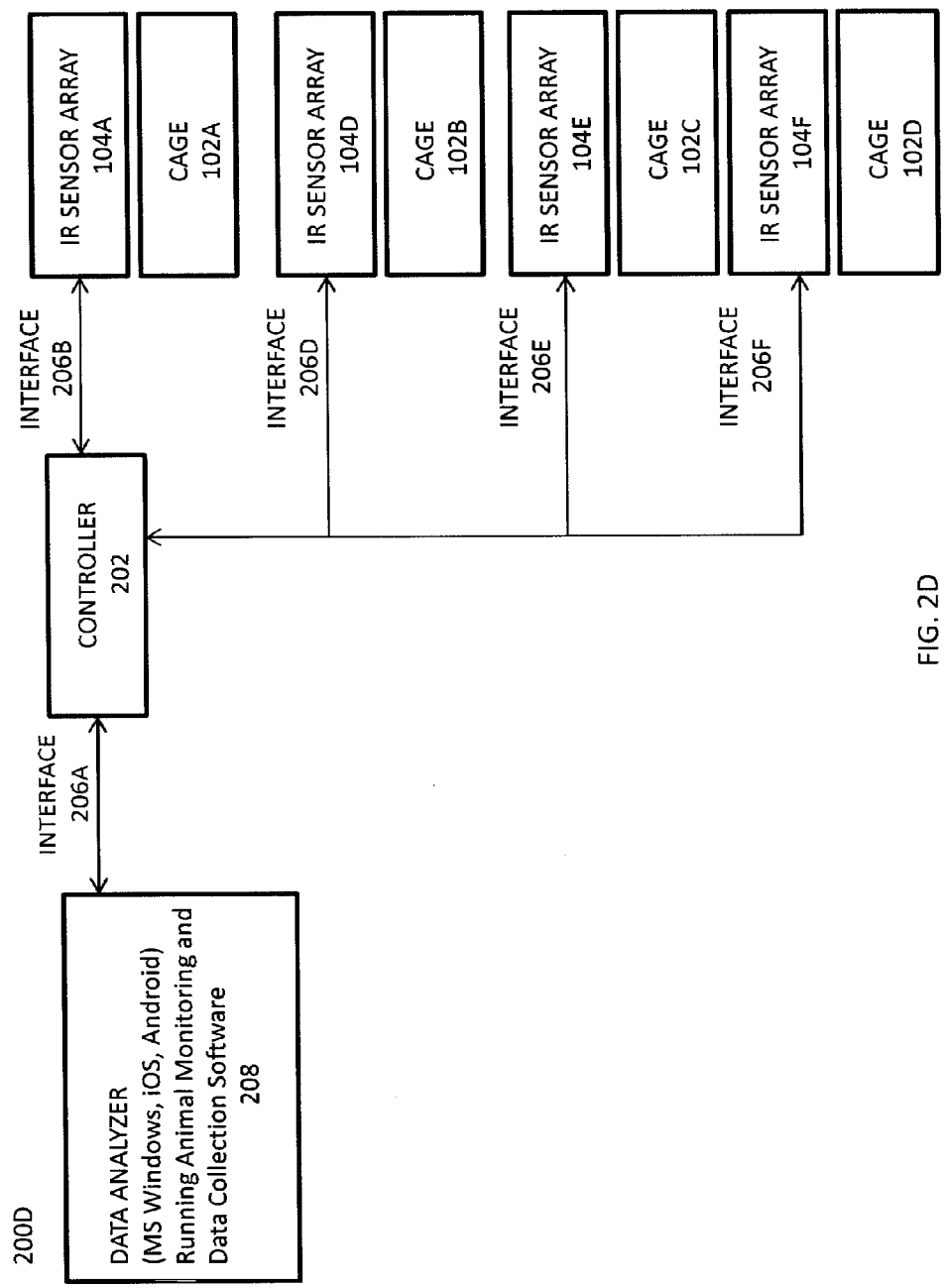
FIG. 2D depicts an animal sensing system wherein a set of sensor arrays are placed on a set of respective cages in accordance with the principles of the present invention.

FIG. 2D depicts the animal sensing system 200D, another embodiment of the animal sensing system of the present disclosure, wherein a set of sensor arrays 104A, 104D, 104E, 104F are placed on a set of respective cages 102A, 102B, 102C, 102D. Each of these IR sensor arrays 104A, 104D, 104E, 104F may compile temperature data and can send the temperature data to the controller 202 via its respective interface 206B, 206D, 206E, 206F. The controller 202 may then compile a correlation of temperature data with a respective identification number, or other identifier, associated with each of the IR sensor arrays 104A, 104D, 104E, 104F. This data may then be sent to the data analyzer 208. Of course, one of ordinary skill in the art can use alternate arrangements not shown in FIGS. 2A-2D within the scope of the present invention.

The various arrangements of cages and sensor arrays in FIGS. 2A-2D are provided by way of example only are not intended to limit how an infrared sensor array can be attached to a cage, how it can be positioned relative to a cage, nor how many cages can be within the field of view of the infrared sensor array. For example, an 80×60 FLIR array was mentioned above that would allow multiple cages to be within the field of view of that array. Furthermore, with that resolution it is also possible to identify and track multiple individual rodents in a single cage. Thus, one of ordinary skill in this field would understand that the ways that cages and sensors can be arranged relative to one another can vary greatly without departing from the scope of the present invention. Similarly, embodiments of the present invention can be practiced with a camera directed through any of the orthogonal planes surrounding a rodent or animal and can be oriented off-center or off-axis relative to any of those planes.

The data analyzer 208 may provide a platform that allows execution of animal monitoring software that can also include data collection software. Such software could be the only software executing on the data analyzer 208. Alternatively, the data analyzer 208 could include an operating system, such as Microsoft Windows, Linux, iOS, Android, etc., and the animal monitoring and data collection software would be compatible with the operating system. The animal monitoring software may send a signal via the interface 206 to an IR sensor array 104A instructing the IR sensor array 104A to take a reading. These signals may be based on time, movement, or other variables of research interest. The data analyzer 208 could be used to receive temperature information. Furthermore, the data analyzer 208 may analyze temperature data received from the IR sensor array 104A or controller 202.

Alternatively, the data analyzer 208 could receive voltage information and could approximate the temperature as described above based on the size and distance of the animal, as well as the intensity of infrared radiation detected or voltage representing such intensity. Furthermore, the data analyzer 208 can execute smoothing algorithms for averaging areas or creating temperature contour maps. These maps may be displayed to the user via a screen. The data may also be stored as an array correlating the animal's position and temperature. This data could then be analyzed to show movement, changes in head positioning, other behavior patterns, or physiological temperature changes. The data analyzer 208 could then be used to correlate this data with other experimental factors to form relationships between the experimental variables. In this manner, fine movement and activity of an animal may be detected and associated with behaviors such as grooming, random eye movement (REM) sleep, non-REM sleep, eating, hyperactivity or other behaviors. The data analyzer 208 could also be used for automatic classification of these behaviors based on patterns observed in the temperature data. For example, presence near the food as well as head movements consistent with eating may give IR temperature data that can be correlated to identify an eating behavior. The eating behavior could then be detected directly through analysis of the IR data rather than requiring video or direct observation. One example of a useful software in these analyses is MATLAB. Due to data analyzer 208 analysis and automation, animal behavior experiments may be scaled.

Figure 3:
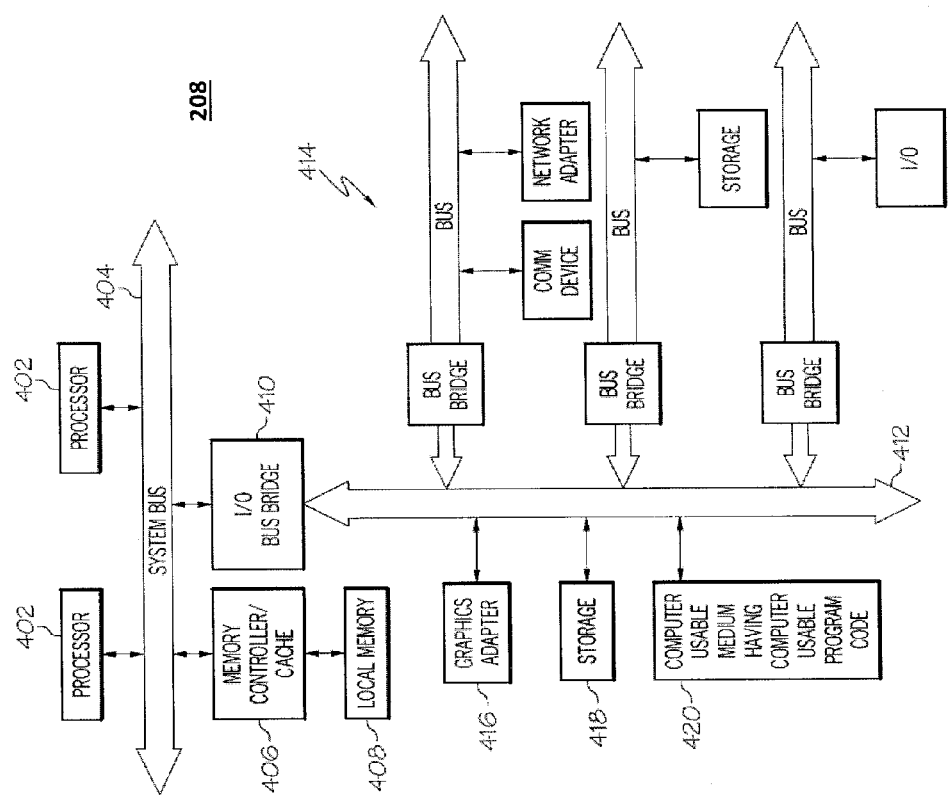
FIG. 3 depicts a block-level diagram of the data analyzer of FIG. 2 having a computer readable storage medium for implementing functions in accordance with the principles of the present invention.

FIG. 3 depicts a block-level diagram of the data analyzer 208 of FIG. 2A-2D. The data analyzer 208 may be any electronic device capable of electronic signal manipulation. Storage by data analyzer 208 may mean by hard drive, memory, or other storage device. Receiving a selection, receiving a user selection, receiving a selected element, and other interactions with the user may be accomplished by event, drag and drop, queries, interrupts, signals, polling, dialog, command, etc. Selections or user selections may be useful in setting parameter for experiment automation, such as to capture a frame at a specified interval wherein the selection may comprise a time interval. Other selections may be made, such as to capture a frame and record time based on a temperature data or pattern of temperature data that correlate to a behavior pattern.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of the data analyzer 208, a general purpose computer, special purpose computer, or other programmable data processing apparatus to produce a machine, such that the instructions, which execute via the processor of the data analyzer 108 or other programmable data processing apparatus, create means for implementing the functions/acts specified in the flowchart and/or block diagram block or blocks.

These computer program instructions may also be stored in a computer readable medium that can direct a data analyzer 208, other programmable data processing apparatus, or other devices to function in a particular manner, such that the instructions stored in the data analyzer readable medium produce an article of manufacture including instructions which implement the function/act specified in the flowchart and/or block diagram block or blocks.

The computer program instructions may also be loaded onto the data analyzer 208, a computer, other programmable data processing apparatus, or other devices to cause a series of operational steps to be performed on the data analyzer 208, other programmable apparatus or other devices to produce a data analyzer 208 implemented process such that the instructions which execute on the data analyzer 208 or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory 308. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. Additionally, functional programming languages, such as LabVIEW, Erlang, OCaml, Haskell, and the like, may be used for the computer program code to carry out operations of the present invention. The program code may execute entirely on the user's data analyzer 208, partly on the user's data analyzer 208, as a stand-alone software package, partly on the user's data analyzer 208 and partly on a remote computer or entirely on the remote computer or server. In the latter scenario, the remote computer may be connected to the user's data analyzer 208 through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, data analyzer 208, special purpose computer, or other programmable data processing apparatus to produce a machine, such that the instructions, which execute via the processor of the data analyzer 208 or other programmable data processing apparatus, create means for implementing the functions/acts specified in the flowchart and/or block diagram block or blocks.

FIG. 3 is a block diagram of a data analyzer system 208 having a computer readable storage medium for implementing functions comprising aspects of the method detailed above. Data analyzer 208 may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 414. The I/O bus 412 may be utilized to support one or more buses and corresponding devices, such as bus bridges, input output devices (I/O devices), storage, network adapters, etc. Thus, a network adapter may be coupled to the system to enable the data processing system to become coupled to other data processing systems or remote printers or storage devices through intervening private or public networks.

Also connected to the I/O bus 412 may be devices such as a graphics adapter 416, storage 418 and a computer usable storage medium 420 having computer usable program code embodied thereon. The computer usable program code may be executed, e.g., by the processor(s) to implement any aspect of the present invention, for example, to implement any aspect of any of the methods, processes and/or system components illustrated in any of the figures of the present application. For instance, the computer usable program code can be utilized to implement a linker that implements any one or more of the methods of these figures. Moreover, the computer usable program code may be implemented in the local memory 408 or other suitable storage medium. The storage 418 may store resources useful in implementing the features previously described. For instance, the storage 418 can store the computer instructions which, when executed, implement any of the methods or actions disclosed herein.

Figure 4:
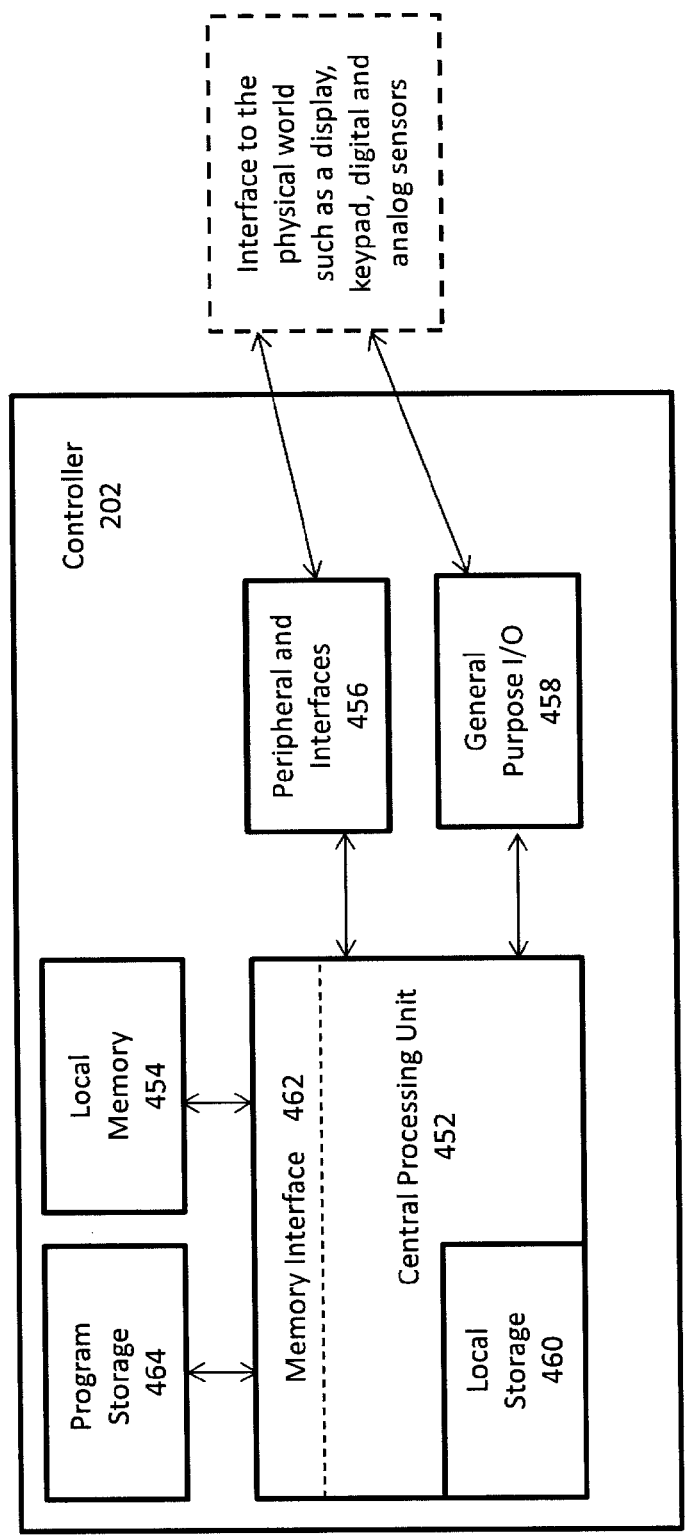
FIG. 4 depicts a block-level diagram of the controller of FIG. 2 wherein the controller is configured for acquiring sensor signals in accordance with the principles of the present invention.

FIG. 4 depicts a block-level diagram of the controller 202 of FIGS. 2A-2D wherein the controller 202 is configured for acquiring sensor signals in accordance with the principles of the present invention. The controller 202 may be any device capable of receiving the temperature data over an interface 206B and sending the temperature data over an interface 206A. For example, the data analyzer 208 or another computer having similar architecture as that of the data analyzer 208 could be used. The controller 202 may also perform operations on and modify the temperature data such as creation of an array to associate the temperature data with the corresponding source IR sensor array 104A.

Controller 202 may comprise a processing unit (CPU) 452, local memory 454, peripherals and interfaces 456, and a general purpose input/output (I/O) interface 458. CPU 452 may further comprise local storage 460. Local storage 460 may be used to store variables for complex calculations. Local memory 454 may interface with the CPU 452 via a memory interface 462. The memory interface 462 may allow the CPU 452 to store calculated values, variables, constants, or any other important electronic signal onto the physical local memory 462. The memory interface 462 may include one or more direct memory access controllers. Of course, part or all of the local memory 462 may be committed to program storage 464, in which data relevant to the operation of the program is stored. Program storage 464 may also be organized into useful data structures such as a stack or heap. The peripherals and interface 456 and the general purpose I/O interface 458 may interface to external input or output devices. Examples of external input or output devices include any electronic device capable of sending or receiving an electronic signal such as keyboards, mice, printers, scanners, digital sensor, analog sensors, Ethernet, analog to digital converters, ADC, UART, USB etc. Program storage 464, local memory 462, peripherals and interface 456, and general purpose I/O interface 458 may be contained on the circuit board of the CPU 452. In other embodiments, any of these parts may be external to the CPU 452.

Figure 5:
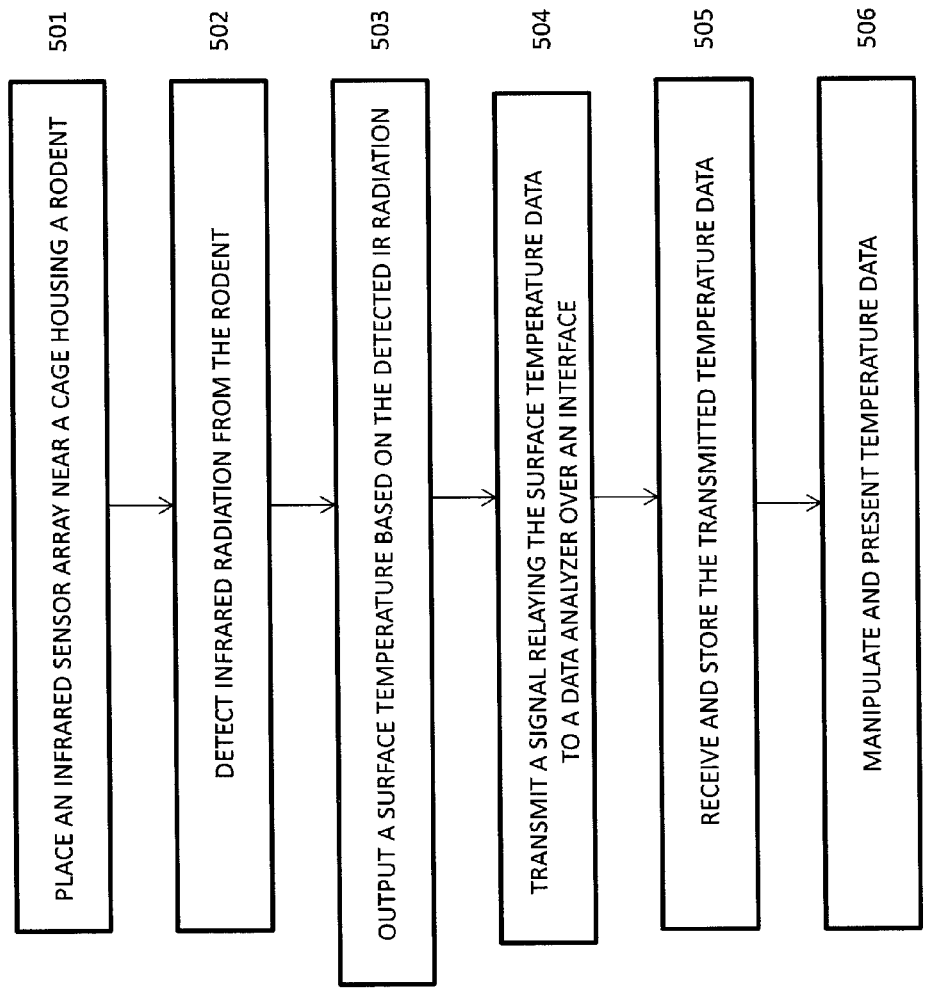
FIG. 5 depicts a flowchart of an exemplary method utilizing an infrared sensor array aimed into a cage to receive an infrared radiation in accordance with the principles of the present invention.

FIG. 5 depicts a flowchart of an embodiment of the present invention wherein an infrared sensor array 104A is aimed into a cage 102A and an infrared radiation is received. In most embodiments, step 501 includes placing the infrared sensor array 104A near a cage 102A housing a rodent means that the infrared sensor is placed on top of, beside, or under the cage 102A. Positioning the IR sensor array 104A on the cage means that the IR sensor array 104A is attached to the top of the cage 102A, suspended over the cage 102A, or otherwise positioned above the cage 102A and angled downward into the cage 102A such that the field of view 106 overlaps at least part of the moving area 101 of the animal. Furthermore, the infrared sensor array 104A may preferably be aimed into the cage 102A such that at least part of the moving area 101 of the contained rodent is within the field of view 106 of the infrared sensor array 104A. The infrared sensor array 104A may also be placed near enough to the cage 102A such that infrared radiation from the rodent may be detected by the infrared sensor array 104A when the rodent is within the field of view 106 of the infrared sensor array 104A.

Next, an infrared radiation from the surface of the rodent may be detected in step 502. The surface of the rodent, as well as many other warm-blooded animals, emits infrared radiation. This radiation is detectable, such as using a Panasonic, Omron, or FLIR infrared sensor array 104A. In step 503, these infrared sensor arrays 104A output an approximation of the surface temperature data representing an average numerical temperature value of the surfaces that emitted the infrared radiation detected as the frame 117. Optionally, detection may be triggered by a specified event. For example, if a target temperature is detected in a specific pixel, a trigger request may be sent as an electronic signal along the interface 206A to the data analyzer 208. The data analyzer 208 may analyze the data sent, such as for detection of false positives. If the data analyzer 208 determines that a triggering event has occurred, the data analyzer 208 may send a trigger to the infrared sensor array 104A to capture the frame 117. Alternatively, the IR sensor array 104A may trigger a frame without making a request to the computer based on detected average pixel temperature in a specified IR sensor or other variables. In another embodiment, the data analyzer 208 may use internal events, such as time, to determine when to send a trigger to the infrared sensor array 104A to capture a frame.

In step 504, this temperature data may be transmitted as a signal over a wired or wireless interface. The temperature data may be transmitted to a data analyzer 208, controller 202, or any other electronic device capable of receiving the signal. The data analyzer 208 may also transmit the data to other electronic devices. Furthermore, the data analyzer 208 may receive and store the data in step 505, such as storing the temperature data in a tree, array, database or any other data structure for relationally storing the temperature data. Furthermore, the data analyzer 208 may add data to the data structure. For example, tags may be added to correlate the temperature data with its respective source infrared sensor array 104A.

In step 506, the temperature data may be manipulated and presented. For example, programs such as MATLAB or LabVIEW may be used to compile the contour map based on temperature data, such as the frame 117. Alternatively, the data may be provided in a graph or chart. Optionally, the data may be smoothed before providing or presentation of the graph or chart. One example smoothing algorithm available in MATLAB divides the range of detected temperatures into five levels with simple thresholding as described in reference to FIGS. 1C and 1D, although more levels are possible. Each level may correspond to a representative color. Pixels 122 of temperature data may be matched to a level and thereby a corresponding color. Furthermore, these colors may be presented to correspond with the pixel location as detected. The levels of each respective pixel 122 may be smoothed to form the contour map 133. Data manipulation, as in step 506, may be performed real time or after the data has been stored by data analyzer 208 and retrieved. Then, the map, graph, or chart may be presented on screen to the user, electronically transferred to another device, or printed using one or more physical media.

Furthermore, correlations between frames may be analyzed by the data analyzer 208 and stored. Frames may be correlated with time elapsed between the frames. This may show position, velocity, and/or direction of rodent movement, which may be useful in determining behaviors such as sleeping, eating, activity, hyperactivity, etc. External stimuli may be used to influence rodent behavior. For example, sleeplessness, starvation, drugs, autism, death etc. may be introduced and the corresponding changes in behavior observed. Sleeplessness may be induced using a vibrating solenoid to shake the cage 102A of the rodent. The data analyzer 208 may be used in tracking changes in position, speed, or direction of the rodent based on the corresponding temperatures detected in the infrared sensor array 104A. Furthermore, these changes may be quantified and characterized based on corresponding patterns of rodent behavior.

Figure 6C:
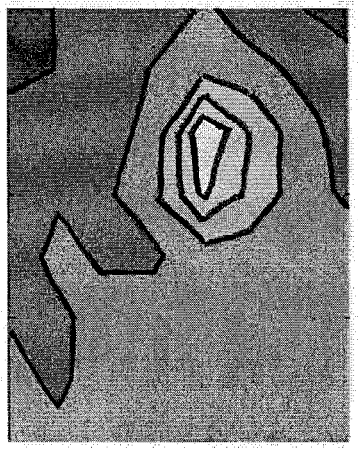
FIG. 6C depicts a contour map developed from the cage of FIG. 6B at a third time subsequent the second time in accordance with the principles of the present invention.
Figure 6B:
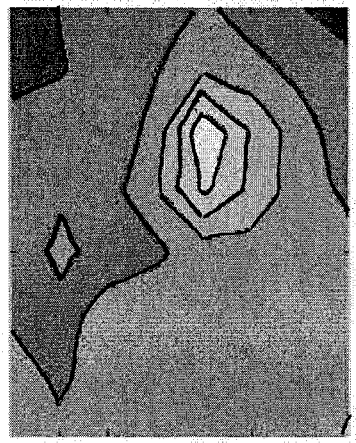
FIG. 6B depicts a contour map developed from the cage of FIG. 6A at a second time subsequent the first time in accordance with the principles of the present invention.
Figure 6A:
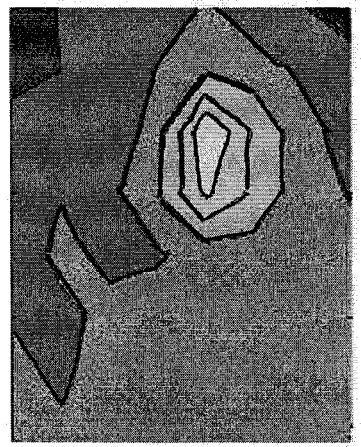
FIG. 6A depicts a contour map developed from a frame taken of a rodent in a cage at a first time in accordance with the principles of the present invention.

FIGS. 6A-6Cc are provided to show sequential contour maps 133 developed from respective frames 117 taken from the cage 102A during the experiment. Correlations between the pictures can indicate rodent behavior. In this example, the rodent was sleeping. These contour maps indicate that the rodent has remained in position over the interval of this sequence.

Figure 7B:
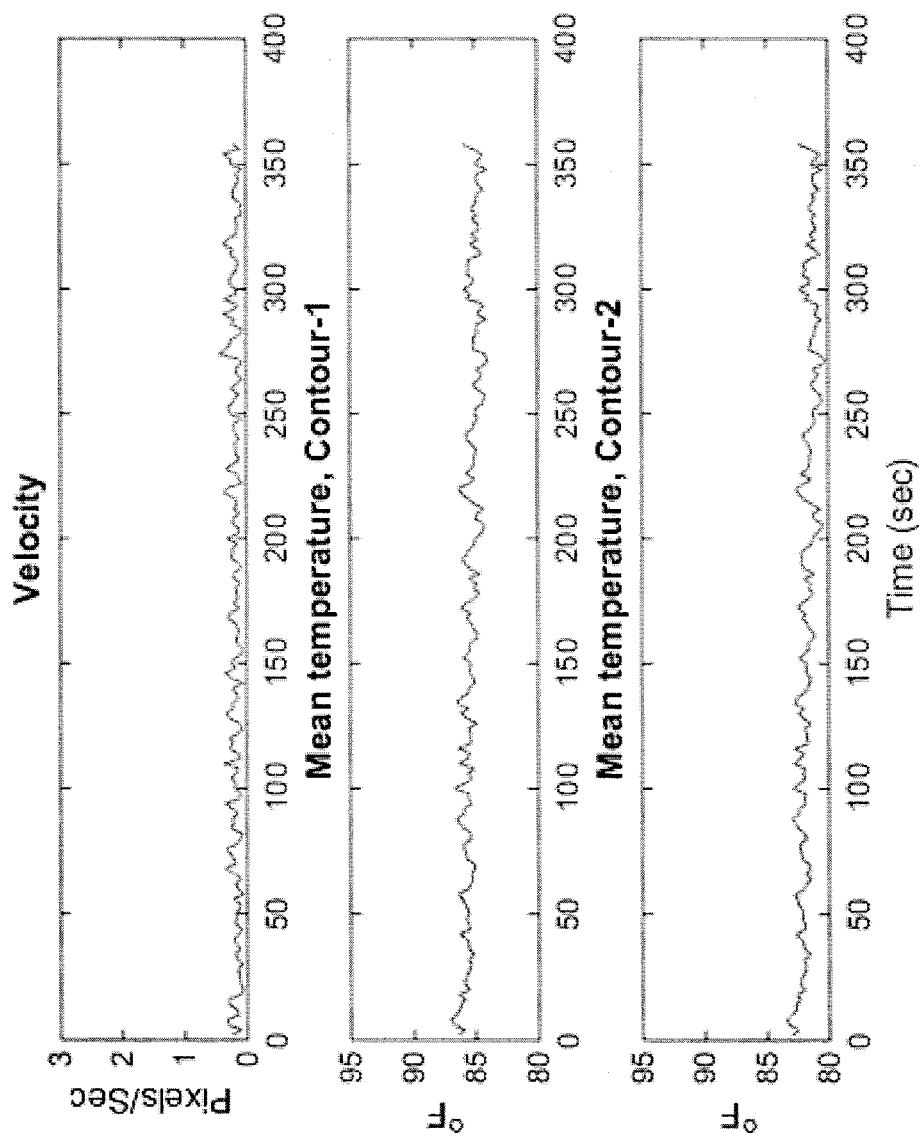
FIG. 7B depicts graphs representing the velocity and mean temperatures of the top two contours over the six minute period of FIG. 7A in accordance with the principles of the present invention.
Figure 7C:
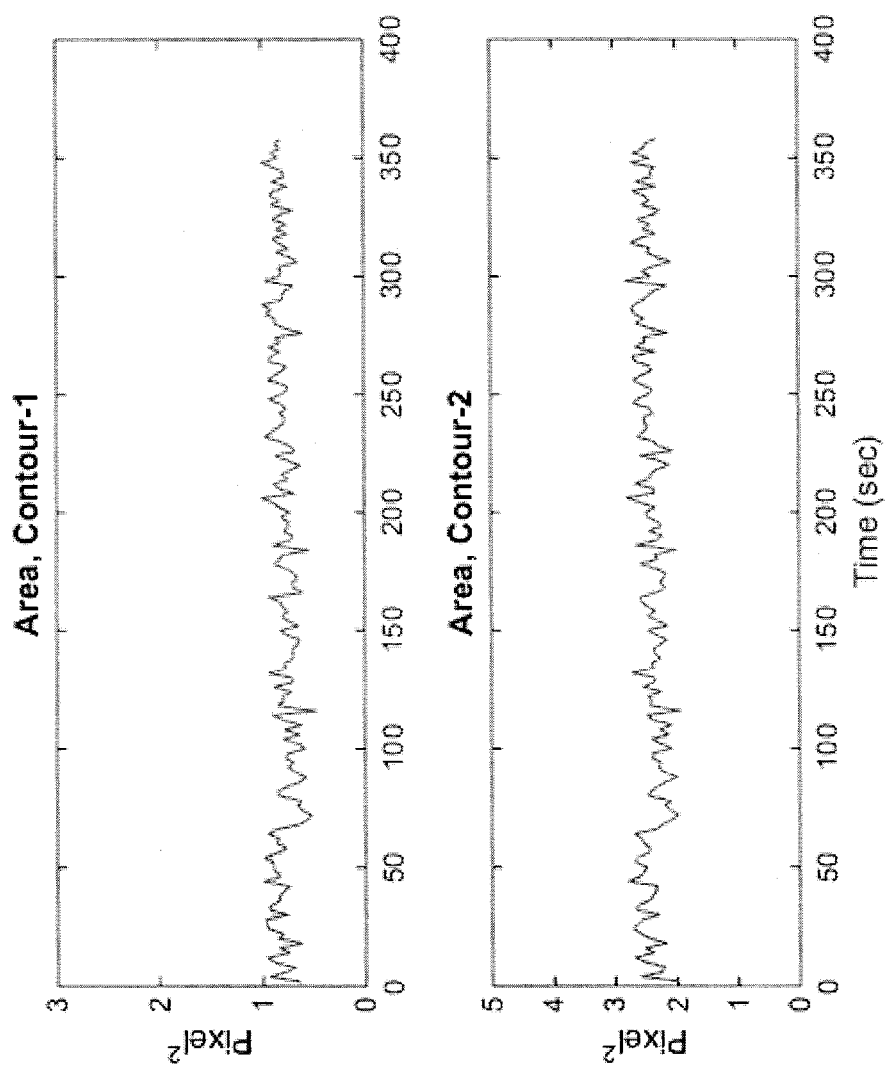
FIG. 7C depicts the area covered by the top two contours over the six minute segment of FIG. 7A in accordance with the principles of the present invention.

As can be seen in FIGS. 7A-7C, the contour level, temperature, and/or a centroid location of the two highest temperature contours, i.e. the fourth contour 130 and the fifth contour 132, may be extracted from respective consecutive frames 117 to estimate the activity levels, changes in body temperatures, and the location of the rodent 103 in the cage 102A.

For example, drugs such as alcohol may increase blood flow to the surface of the rodent 103 and therefore more heat may radiate from the rodent 103. The resulting fourth contour 130 and fifth contour 132 may have a larger area and/or higher temperature than that of a sober rodent 103. Additionally, movements, such as raising the rodents head, may increase the area under the fourth contour 130 and/or the fifth contour 132. The centroid location of the two highest contours could also be altered by these and other experimental variables. Change in position of the centroid location of the two highest contours 130, 132 could indication change in position of the rodent 103. Changes in velocity could be determined by analyzing the distance over time of multiple respective changes in position of the rodent 103. Of course, one of ordinary skill could find other experimental variables to induce behavior change in the rodent 103 and detect changes in behavior with the system 200A-200D.

Returning to FIG. 7B, the temperature and area of the top two contours 320, 322 were averaged to yield one data point every two seconds. Therefore, the mean temperature may comprise the average of the temperature detected twenty times over the two second period. The velocity in pixels/sec of the animal was estimated in FIG. 7B by integrating the displacement of the top contour centroid over two seconds. A histogram map 702 of the centroid locations was created in FIG. 7A to estimate the time spent by the rodent in a particular area of the cage. The histogram map 702 consisted of 16 bins 704 formed by mapping the location of the centroid in the 8×8 sensor grid to a 4×4 area. Of course, different numbers of bins 704 could be used. Also, in addition to tracking contours, a peak temperature can be identified, its location in different frames could even be identified and tracked as well.

FIGS. 7A-7C show an example of features extracted from a six minute segment where the rodent 103 was sleeping. FIG. 7a shows the histogram map 702 and the number within each bin representing the number of seconds spent in that bin 702. Each bin represents a physical location in the moving area 101 of the rodent 103. The map clearly depicts that the rodent 103 spent most of the time in one location of the cage and thus was stationary. FIG. 7b shows the velocity, calculated using the centroid location of the top most contour 132, and mean temperatures of the top two contours 132, 130. The velocity graph is displayed in time (seconds) v. pixels/second. FIG. 7C shows the area covered by the top two contours 132, 130. As can be seen, the graph of FIG. 7C is in time v. pixels squared.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for detecting rodent behavior, comprising:
positioning a first infrared sensor array such that at least part of an interior of a cage is within a first field of view of the first infrared sensor array;
  wherein the cage comprises a cage floor and a cage perimeter, and
  wherein the first infrared sensor array comprises a plurality of infrared sensing elements each comprising a respective field of view;
receiving a first blackbody signal from a rodent in the cage, wherein the first blackbody signal comprises infrared radiation that radiated from a surface of the rodent to at least one infrared sensing element in the first infrared sensor array;
generating a first frame of temperature data from the received blackbody signal, wherein the first frame comprises a set of pixels;
wherein each respective pixel represents a respective pixel average surface temperature;
wherein each respective pixel average surface temperature corresponds to an average blackbody surface temperature of any surfaces within the respective fields of view of the sensing elements;
deriving a set of contour levels based on a highest temperature and a lowest temperature of the first frame of temperature data, each contour level associated with a different one of a plurality of temperature sub-ranges between the highest temperature and the lowest temperature;
assigning each of the pixels to a corresponding one of the contour levels based on the respective pixel average surface temperatures of that pixel being within the temperature sub-range of the corresponding one contour level; and
generating a contour map of the first frame based on the contour levels and the assigned pixels.

2. The method of claim 1, wherein:
the first infrared sensor array is positioned above the cage and the first field of view is directed toward the cage floor, wherein all of an entire moving area of the rodent is within the first field of view.

3. The method of claim 2, comprising:
positioning a second infrared sensor array beside the cage, wherein a second field of view of the second infrared sensor array is directed through the cage perimeter.

4. The method of claim 1, wherein positioning the first infrared sensor array comprises:
positioning the first infrared sensor array beside the cage such that the first field of view is directed through the cage.

5. The method of claim 1, comprising:
positioning multiple respective infrared sensor arrays, wherein each respective infrared sensor array is directed into one of a plurality of respective cages, wherein each cage houses a respective rodent.

6. The method of claim 5, wherein at least two respective infrared sensor arrays are positioned at each respective cage, each of the at least two respective sensor arrays having a respective field of view that is directed into the respective cage.

7. The method of claim 1, the method further comprising:
determining a first area of a first contour of the contour map, the first contour corresponding with a first one of the contour levels associated with a highest one of the temperature sub-ranges;
determining a first centroid of the first contour;
determining a second area of a second contour of the contour map, the second contour corresponding with a second one of the contour levels associated with a second-highest one of the temperature sub-ranges; and
determining a second centroid of the second contour.

8. The method of claim 7, further comprising:
determining between a sleep state of the rodent and a wake state of the rodent based on a size of an area of at least one of the first and the second areas.

9. The method of claim 1, further comprising:
periodically generating a new frame of respective temperature data; and
for each new frame of respective temperature data:
deriving a respective set of contour levels based on a highest temperature and a lowest temperature of the respective temperature data, each contour level of the respective set of contour levels associated with a different one of a respective plurality of temperature sub-ranges between the highest temperature and the lowest temperature of the respective temperature data;
assigning each of the pixels of the new frame to a corresponding one of the respective contour levels based on the respective pixel average surface temperatures of that pixel being within the temperature sub-range of the corresponding one contour level; and
generating a respective contour map of the new frame based on the respective set of contour levels and the assigned pixels of that new frame.

10. The method of claim 9, further comprising:
for each respective contour map:
determining a respective first area of a first contour of the respective contour map, the first contour corresponding with a first one of the respective contour levels associated with a highest one of the respective plurality of temperature sub-ranges; and
determining a respective first centroid of the first contour.

11. The method of claim 10, further comprising:
determining a histogram map of a position of the rodent over time based on the respective centroids of the respective first contours of the respective contour maps.

12. The method of claim 11, further comprising:
determining a velocity of the rodent over time based on the position of the rodent over time based on the respective centroids of the respective first contours of the respective contour maps.

13. The method of claim 11, further comprising:
determining between a sleep state of the rodent and a wake state of the rodent based on the determined velocity of the rodent.

14. The method of claim 1, further comprising:
displaying the first contour as a first color on the contour map; and
displaying the second contour as a second color on the contour map.

15. A system for detecting rodent movement, comprising:
a first cage for a first rodent;
a first infrared sensor array configured to receive a first signal comprising infrared radiation radiated from a surface of the first rodent and capture a first frame of temperature data therefrom;
wherein a first field of view of the first infrared sensor overlaps at least a portion of a moving area of the first rodent;
a first interface coupled with the first infrared sensor array and configured to output the first frame of temperature data to a data analyzer;
wherein the data analyzer is configured to receive the first frame output from the first interface and to generate a first contour map therefrom, and
wherein the data analyzer is configured to receive a series of frames comprising periodically captured new frames of respective temperature data.

16. The system of claim 15, further comprising:
a second infrared sensor array configured to receive a second signal comprising infrared radiation radiated from the surface of the first rodent and capture a second frame of temperature data;
a second interface coupled with the second infrared sensor array and configured to output the second frame of temperature data to the data analyzer;
wherein the data analyzer is configured to receive the second frame output from the second interface and to generate a second contour map therefrom.

17. The system of claim 15, further comprising:
a second cage for a second rodent;
a second infrared sensor array configured to receive a second signal comprising infrared radiation radiated from a surface of the second rodent and generate a second frame of temperature data therefrom;
wherein a second field of view of the second infrared sensor overlaps at least a portion of a moving area of the second rodent.

18. The system of claim 15, wherein the first infrared sensor array is configured to capture the first frame on receipt of a trigger.

19. The system of claim 15, further comprising:
a controller in communication with the data analyzer and the first interface,
wherein the first interface is configured to communicate the series of frames to the controller, and
wherein the controller is configured to communicate the series of frames to the data analyzer.

20. The system of claim 19, wherein
the data analyzer comprises:
a processor;
a memory accessible by the processor and storing code executable code that when executed causes the processor to:
determine, for each new frame, a respective position of the first rodent in the first cage; and
determine, based on the series of frames, a velocity of the first rodent in the first cage.

* * * * *